United States Patent [19]
Kawada et al.

[11] Patent Number: 5,396,453
[45] Date of Patent: Mar. 7, 1995

[54] RECORDING/REPRODUCING APPARATUS SUCH AS A MEMORY APPARATUS

[75] Inventors: Haruki Kawada, Yokohama; Toshihiko Miyazaki, Hiratsuka; Hideyuki Kawagishi, Ayase; Akihiko Yamano, Yokohama, all of Japan

[73] Assignee: Canon Kabushiki Kaisha, Tokyo, Japan

[21] Appl. No.: 272,373

[22] Filed: Jul. 6, 1994

Related U.S. Application Data

[63] Continuation of Ser. No. 780,873, Oct. 17, 1991, abandoned.

[30] Foreign Application Priority Data

Oct. 19, 1990 [JP] Japan ................... 2-280825

[51] Int. Cl.$^6$ .............................. G11B 9/00
[52] U.S. Cl. .................... 365/151; 365/152; 369/100; 369/126; 250/306; 250/310
[58] Field of Search ............. 365/151, 152; 369/100, 369/126; 250/306, 310

[56] References Cited

U.S. PATENT DOCUMENTS

| | | | |
|---|---|---|---|
| 4,998,016 | 3/1991 | Nose et al. | 250/306 |
| 5,036,490 | 7/1991 | Kajimura et al. | 365/151 |
| 5,075,548 | 12/1991 | Kajimura | 250/306 |

FOREIGN PATENT DOCUMENTS

| | | |
|---|---|---|
| 0272935 | 6/1988 | European Pat. Off. . |
| 0307210 | 3/1989 | European Pat. Off. . |
| 0368579 | 5/1990 | European Pat. Off. . |
| 2637409 | 4/1990 | France . |
| 63-161552 | 7/1988 | Japan . |
| 63-161553 | 7/1988 | Japan . |
| 89-07259 | 8/1989 | WIPO . |
| 90-15986 | 12/1990 | WIPO . |

OTHER PUBLICATIONS

Helvetica Physica Acta, *Scanning Tunneling Microscopy*, G. Binnig et al., vol. 55, 1982, pp. 726–735.

*Primary Examiner*—Viet Q. Nguyen
*Attorney, Agent, or Firm*—Fitzpatrick, Cella, Harper & Scinto

[57] ABSTRACT

A memory apparatus for effecting the writing or reading of information on a recording medium by a probe has a base having the probe attached thereto, a substrate supporting the recording medium thereon and movable relative to the base, and a frame containing the base and the substrate therein, and the coefficients of linear expansion of the base and the substrate are made approximate to each other since the coefficients of linear expansion of the base and the substrate are approximate to each other, any relative positional deviation between the probe and the recording medium will not occur even if temperature changes.

10 Claims, 4 Drawing Sheets

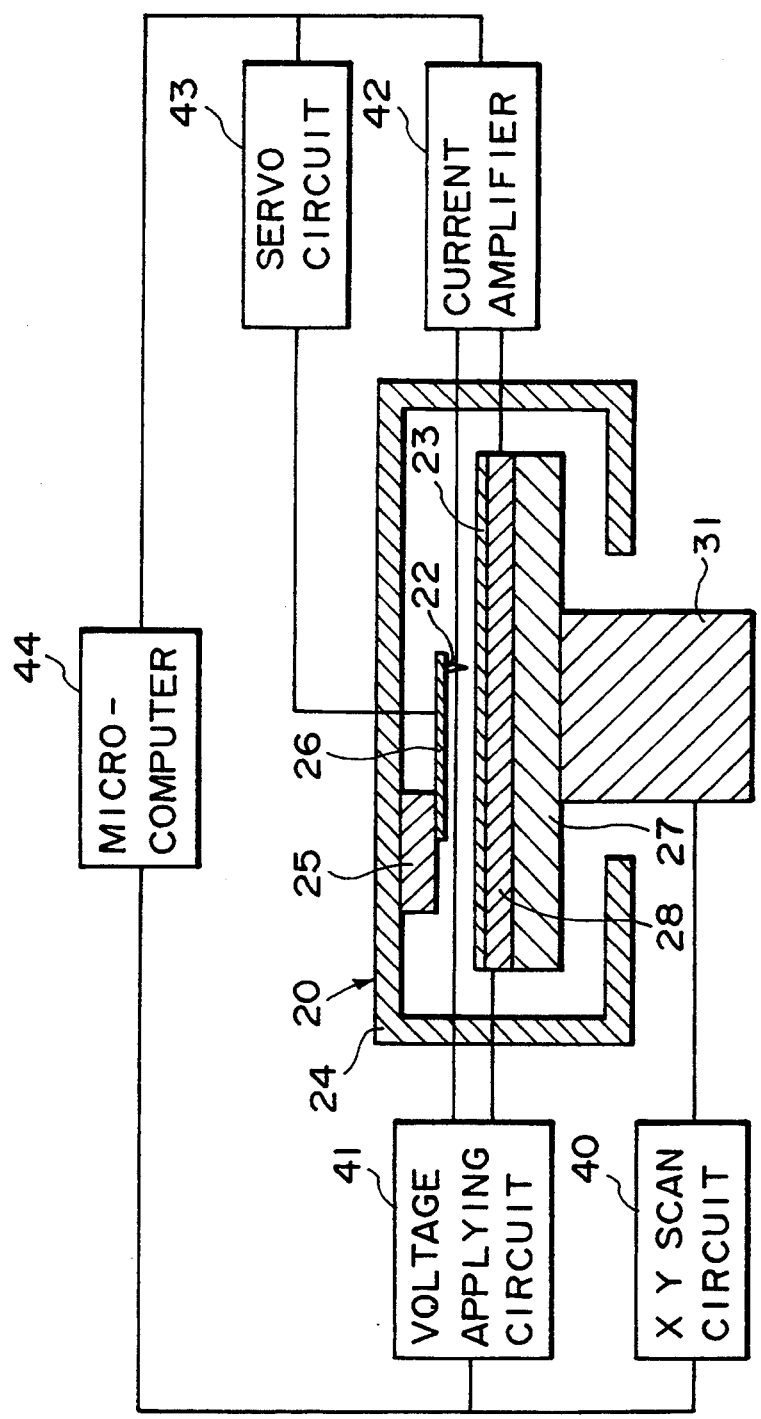
F I G. 5

RECORDING/REPRODUCING APPARATUS SUCH AS A MEMORY APPARATUS

This application is a continuation of application Ser. No. 07/780,873, filed Oct. 17, 1991, which is now abandoned.

BACKGROUND OF THE INVENTION

1. Field of the Invention

This invention relates, for example, to a memory cartridge and a system using the same.

2. Related Background Art

Recent years have seen the development of a scanning tunneling microscope (hereinafter referred to as the STM) through which electron structure on and near the surface of a substance can be directly observed (G. Binnig et al., Helvetica Physica Acta, 55, 726 (1982), and irrespective of single crystal or amorphous materials, it has become possible to observe a real spatial image with high resolving power and moreover, this microscope has the advantage that measurement can be accomplished with low electric power almost without imparting damage by electric current to the sample substance and further, this microscope operates not only in super-high vacuum but also in the atmosphere and solution and can be applied to various materials and therefore, wide application thereof is expected.

The STM utilizes the phenomenon that when a voltage is applied between a conductive probe and an electrically conductive sample and the probe is brought close to a distance of about 1 nm, the tunnel current starts flowing. Recently, as disclosed, for example, in Japanese Laid-Open Patent Application No. 63-161552 and Japanese Laid-Open Patent Application No. 63-161553, there have been made numerous propositions to apply the principle of this STM to construct a memory apparatus chiefly for super-high density recording and reproduction. That is, if use is made of a method in which by a probe electrode corresponding to the probe of the STM, physical deformation is imparted to a recording medium corresponding to a sample, or the electron state of the surface of the medium is changed to record information and the information of recording bits is reproduced by a tunnel current flowing between the two, it is considered that large-scale information can be recorded and reproduced at a high density of the order of molecule or atom.

It has recently been reported that in the above-described recording method, to impart physical deformation, besides an acute recording probe being pressed against the recording medium, a pulse voltage can be applied onto a recording material of graphite or the like to thereby form a hole therein. That is, the probe electrode is brought close to the surface of the recording medium, and then the application of a voltage is effected between the two with 3–8 V and a pulse width of 1–100 $\mu$s, whereby a hole of a diameter of about 40 Å can be formed, and such hole can be sufficiently used as a recording bit. On the other hand, to change the electron state to accomplish recording, there is known a method whereby cumulative film of appropriate organic molecules is made on a ground electrode by the Langmuir-Blodgett's technique (hereinafter referred to as the LB technique) or the like and a voltage is applied between the ground electrode and the probe electrode to vary the electrical resistance characteristic of this minute portion, and attention is paid to this method because of the ease of erasing and rewriting.

FIG. 6 of the accompanying drawings shows the construction of a memory apparatus according to the prior art in which the electron state is changed to effect recording. On a movable substrate 2 provided on a coarse movement mechanism 1, there are placed a ground electrode 3 and a recording medium 4 having a switching memory effect, and a probe electrode 6 attached to a three-dimensional (3-D) driving mechanism 5 is provided in opposed relationship with the recording medium 4, and the coarse movement mechanism 1 is first driven by a microcomputer 7 and a coarse movement control circuit 8, whereby rough alignment of the probe electrode 6 and the recording medium 4 is accomplished. During recording, when the three-dimensional driving mechanism 5 is driven by an XY scan driving circuit 9 to scan the probe electrode 6 on the recording medium 4 and at a recording position, a pulse voltage is applied to the probe electrode 6 and the ground electrode 3 by a voltage applying circuit 10, regions locally differing in electrical resistance from one another are created in the recording medium 4 and recording is effected.

During reproduction, the probe electrode 6 is scanned on the surface of the recording medium 4 while such a degree of constant voltage that a tunnel current flows is applied between the probe electrode 6 and the recording medium 4. The tunnel current obtained at that time is amplified and detected by a current amplifier 11, and the three-dimensional driving mechanism 5 is driven by a servo circuit 12 so that the tunnel current may always assume a predetermined value, whereby the probe electrode 6 is moved in a vertical direction, and the amount of movement in this vertical direction corresponds to recording information. All these controls are effected by the microcomputer 7.

As described above, to utilize the tunnel current, it is necessary that the probe electrode is brought close to the recording medium 4 up to about 1 nm, and a highly accurate working and manufacturing technique is required of the probe electrode 6 and the recording medium 4.

However, to put the recording and reproducing method as described above into practical use, it is of course necessary to accomplish very highly accurate and quick position adjustment (tracking) of the probe electrode 6 and the recording medium 4 during the interchange of the recording medium 4, and if the temperature of the apparatus changes, the movable substrate 2 on which the recording medium 4 is placed 10 and the region to which the probe electrode 6 is attached will thermally expand and the relative position of the recording medium 4 and the probe electrode 6 will shift, and this leads to the risk of causing an error to recording and reproduction.

This is a great problem particularly in a so-called multiprobe system wherein multiple probes are parallel-disposed. The multiprobe system is large in its area in XY direction because multiple probes are parallel-disposed therein, and when generally viewed, there is great amount of variation by a temperature change in this system. Assuming that a temperature change has occurred and the intervals between the adjacent probes have changed, even if a certain probe is tracked to a prescribed position on the recording medium, the other probes will deviate from the prescribed position.

SUMMARY OF THE INVENTION

It is an object of the present invention to provide a memory cartridge which, even when there is a temperature change of an apparatus or a recording medium, can eliminate the relative positional deviation between the recording medium and a probe and can accomplish recording and reproduction with few errors and which is of high accuracy and high reliability, and a memory system using the same.

To achieve the above object, the memory cartridge according to the present invention in one form thereof has a base having a plurality of probes attached thereto, a substrate on which a recording medium is placed and which is movable relative to said base, and a frame containing said base and said substrate therein, and is characterized in that the coefficients of linear expansion of said base and said substrate are approximated to each other.

Also, in one form of the system of the present invention related to the above specific invention, there is installed a memory cartridge which has a base having a plurality of probes attached thereto, a substrate on which a recording medium is placed and which is movable relative to said base, and a frame containing said base and said substrate therein and in which the coefficients of linear expansion of said base and said substrate are made approximate to each other, and the system is characterized in that recording or reproduction is effected on said recording medium through said probes.

In the memory cartridge having the above-described construction and he system using the same, the coefficients of linear expansion of the base having the probes attached thereto and the movable substrate on which the recording medium are approximate to each other and therefore, even if temperature changes, the relative positional deviation between the probes and the recording medium will not occur.

BRIEF DESCRIPTION OF THE DRAWINGS

FIGS. 1 to 5 show an embodiment of a memory cartridge according to the present invention and of a memory system using the same, FIG. 1 being a cross-sectional view of the system with the memory cartridge inserted in the system body, FIG. 2 being an enlarged perspective view illustrating a method of mounting probe electrodes, FIG. 3 being an enlarged cross-sectional view of the memory cartridge, FIG. 4 being a pictorial perspective view of the memory cartridge, and FIG. 5 being a circuit diagram of the system with the memory cartridge inserted in the system body.

DETAILED DESCRIPTION OF THE PREFERRED EMBODIMENTS

The present invention will hereinafter be described in detail with respect to an embodiment thereof shown in FIGS. 1 to 5.

Figure 1:
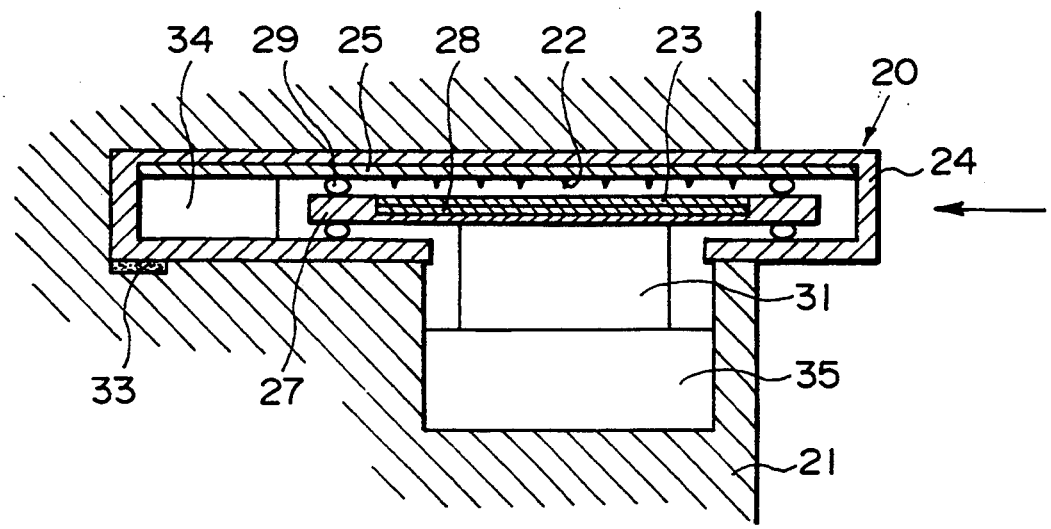
Figure 2:
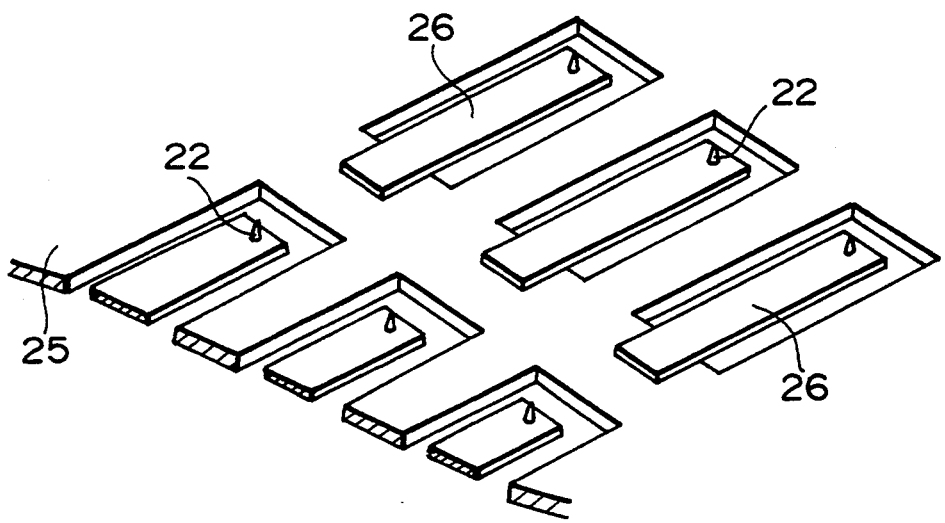
Figure 3:
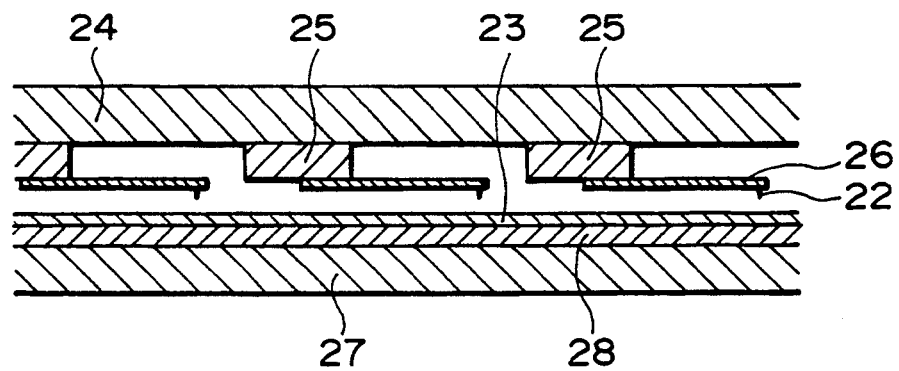

Referring to FIG. 1 which is a cross-sectional view of a memory cartridge according to the present invention and a memory system using the same, the memory cartridge 20 is inserted in a system body 21. In the memory cartridge 20, at least one (in the present embodiment, several hundred) probe electrodes 22 are contained in a frame 24 together with a recording medium 23 and made into a cartridge, which is removably constructed with respect to the system body 21. The probe electrodes 22 are formed of tungsten or like material and have a very acute tip end. Each probe electrode, as shown in FIG. 2, is attached to one end of a bimorph beam 26 which is a cantilever supported on a base 25. The cross-sectional construction of the bimorph beam 26 is, for example, an upper electrode (Au)/insulating film ($Si_3N_4$)/a piezo layer (ZnO)/insulating film ($Si_3N_4$)/an intermediate electrode (Au)/insulating film ($Si_3N_4$)/a piezo layer ( ZnO )/insulating film ($Si_3N_4$)/a lower electrode (Au), and its dimensions may be 750 $\mu m \times 150 \mu m$ and its thickness may be of the order of 7.5 $\mu m$. Where the two piezo layers of this bimorph beam 26 are polarized in the same direction, voltages of the same polarity, such as positive (negative) for the upper electrode and positive (negative) for the lower electrode, are applied to the upper and lower electrodes relative to the intermediate electrode, whereby the tip end of the bimorph beam 26, i.e., the probe electrode 22, is displaced, and for example, in the case of the above-described cartridge, the amount of displacement of the probe electrode is about 5 $\mu m$ for applied voltages of $\pm 15$ V. The wiring from each probe electrode 22 and a circuit for conducting the driving voltage of each bimorph beam 26 can be formed on the base 25 and each bimorph beam 26. The manufacturing of the probe electrodes 22 and bimorph beams 26 as described above can be accomplished by a method called micromechanics or micromachining [K. E. Petersen, *Proc. IEEE* 70, 420 (1982) and T. R. Albrecht et al., *4th International Conference on STM/STS* (STM '89) pp. 1–29, S10-2].

Figure 4:
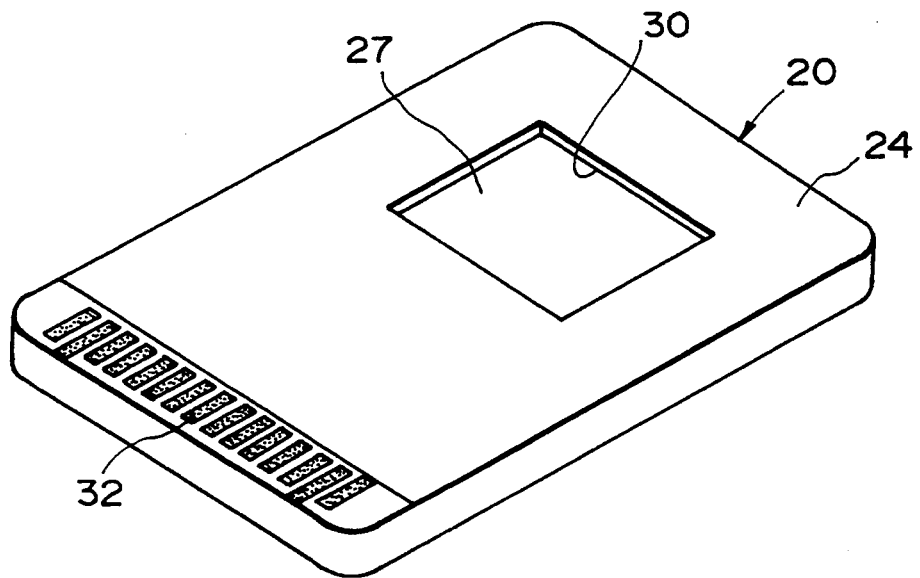
Figure 6:
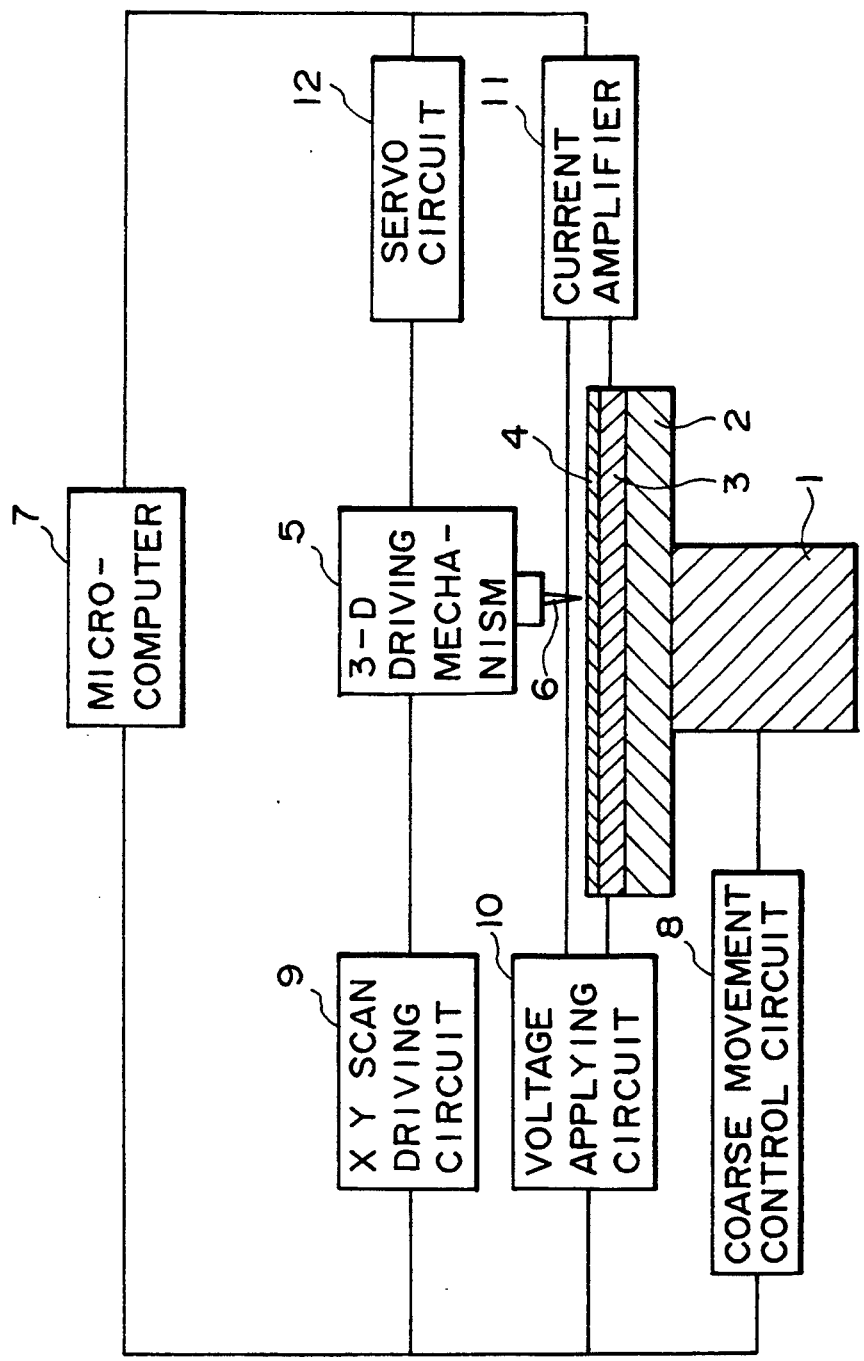
FIG. 6 is a circuit diagram of an example of the prior art.

The bases 25 to which the bimorph beams 26 have been attached in this manner are sticked on the inner part of the upper surface of the frame 24 with the tip ends of the probe electrodes 22 facing downward. On the other hand, the recording medium 23 is provided on a ground electrode 28 placed on a movable substrate 27, which is supported relative to the frame 24 by packings 29 comprising mechanical seals disposed on the upper and lower surfaces of the end portions of the movable substrate, whereby the recording medium 23 is made movable with the movable substrate 27 in XY direction, i.e., in a horizontal plane, while keeping its distance from the base 25 constant. As shown in FIG. 4 which is a perspective view of the lower surface of the memory cartridge 20, a rectangular window 30 is formed in the lower surface of the frame 24 so that the lower surface of the movable substrate 27 can be seen therethrough, and the XY driving mechanism 31 of the system body 21 is adapted to bear against the movable substrate 27. Further, a plurality of electrodes 32 are formed on the lower end portion of the frame 24, and come into contact with an electrode connecting portion 33 provided in the system body 21 when the memory cartridge 20 is inserted into a prescribed position within the system body 21 as indicated by arrow in FIG. 1, and they are used for the connection of signals and a power source. These electrodes 32 are basically connected to the probe electrodes 22 and the bimorph beams 26 within the frame 24, but as required, at least a portion of a driving circuit which will be described later is contained as a driving circuit 34 in the memory cartridge 20. Materials identical or approximate to each other in coefficient of linear expansion are chosen for the bases 25 and the movable substrate 27.

On the other hand, the system body 21 is provided with the aforementioned XY driving mechanism 31 movable in XY direction, and a vertically moving mechanism 35 is mechanically connected to the lower portion of the XY driving mechanism 31 so that when the vertically moving mechanism 35 is moved upward, the XY driving mechanism 31 may be inserted into the memory cartridge 20 inserted in the system body 21, through the window 30 and bear against the movable substrate 27. For example, a piezo-electric element made into a so-called inch worm construction can be used as the XY driving mechanism.

Also, by the contact of the memory cartridge 20 with the electrodes 32, a driving circuit as shown in FIG. 5 is completed in the system body 21. That is, there are provided an XY scan circuit 40 for scanning and driving the XY driving mechanism 31 in XY direction, a voltage applying circuit 41 for applying a voltage between the probe electrodes 22 and the ground electrode 28, a current amplifier 42 for amplifying a tunnel current flowing between the probe electrodes 22 and the recording medium 23, a servo circuit 43 for adjusting a voltage applied to the bimorph beams 26 so that the current value detected by the use of the current amplifier 42 may become constant, and a microcomputer 44 for effecting the control of the entire system, the analysis of data, etc. A coarse movement mechanism, a coarse movement driving circuit, probe electrodes 22, bimorph beams 26 and the accessory circuit thereof are not shown in FIG. 5.

In the above-described construction, the XY driving mechanism 31 is lowered to a position in which it does not hamper the mounting of the memory cartridge 20 in the direction of arrow in FIG. 1, by the vertically moving mechanism 35 and the memory cartridge 20 is mounted into the system body 21, and then the XY driving mechanism 31 is lifted and inserted into the memory cartridge 20 through the window 30 so as to mechanically bear against the movable substrate 27, and during the mounting of the memory cartridge, the electrodes 32 are brought into contact with the electrode connecting portion 33, whereby a driving circuit is completed. During recording, erasing or reproduction, a voltage is applied to the probe electrodes 22 by the voltage applying circuit 41, and the tunnel current flowing between the probe electrodes 22 and the recording medium 23 is amplified and detected by the current amplifier 42. Also, the voltage applied to each bimorph beam 26 is controlled by the servo circuit 43, the microcomputer 44, etc., whereby the distance between each probe electrode 22 and the recording medium 23 is controlled and the scanning of the recording medium 23 in XY plane direction is effected by the XY driving mechanism 31 driven by the XY scan circuit 40. Also, where a plurality of probe electrodes 22 are present, the selection thereof can be accomplished by the driving circuit 34 or the microcomputer 44.

Also, by making the coefficients of linear expansion of the bases 25 and the movable substrate 27 approximate to each other as described above, the relative positional deviation between the bases 25 and the movable substrate 27, i.e., between the probe electrodes 22 and the recording medium 23, caused by any temperature change can be reduced and the occurrence of recording and reproduction errors by any temperature change can be decreased.

Actual recording on the recording medium 23 may be accomplished by one of two methods, i.e., a method of imparting physical deformation to the recording medium 23 and a method of varying the electron state of the recording medium 23. Where physical deformation is imparted to the recording medium 23, use is made of a recording medium 23 comprising, for example, a silicon (Si) wafer made integral with the recording medium 23, the ground electrode 28 and the movable substrate 27, and silicon molded articles are also used as the bases 25, and the probe electrodes 22 are urged against the recording medium 23 to physically vary the recording medium 23, thereby accomplishing recording. During reproduction, when the probe electrodes 22 are two-dimensionally scanned so that the tunnel current may assume a constant value of e.g. 0.1 nA while a DC voltage of e.g. 200 mV is applied to the probe electrodes 22 and the recording medium 23, reproduction can be accomplished because the then feedback driving amount of the bimorph beams 26 corresponds to the recording information on the recording medium 23.

According to the experiment we have carried out under the above-described conditions, reproduction experiments in which at room temperature, recording bits are formed on the surface of a silicon wafer in the form of stripes at intervals of about 1 $\mu$m, and then the probe electrode 22 is moved at a constant speed along the direction of the stripes of the bits and the changed position of the detected current is read, have been carried out at a low temperature of 0° C., at room temperature and at a high temperature of 50° C., with a result that in all cases, reproduction bits could be detected at the same intervals. Also, when a germanium (Ge) wafer approximate to silicon in coefficient of linear expansion has been used as the recording medium 23, reproduction bits substantially at the same intervals have been obtained in similar experiments.

Where the electron state of the surface of the recording medium 23 is varied, for example, six laminated layers of polyimide consisting of pyromellitic acid anhydride formed by the LB technique and 4,4-diaminodiphenyl ether is used as the recording medium 23. If the probe electrodes 22 are brought close to the recording medium 23 and a rectangular wave pulse voltage of 3.5 V and pulse width of 50 ns is applied thereto, the recording medium will cause a change in characteristic (a change in conductivity) and portions of low electrical resistance will be created, whereby recording can be accomplished. Reproduction, as in the other case, can be executed by the detection of a tunnel current, and erasing can be accomplished by a triangular wave pulse voltage of 5 V and pulse width of 1 $\mu$s being applied to the recording medium.

In our experiments wherein a silicon wafer was used with the bases 25 and the movable substrate 27 in the above-described methods, there were obtained reproduction bits of intervals which did not depend on temperature by recording and reproduction experiments similar to those previously described.

The memory cartridge described above and the memory system using the same can decrease the occurrence of recording and reproduction errors for any temperature change, and are very useful to put such apparatus into practical use.

Also, the memory cartridge 20 made into a cartridge by the probe electrodes 22 and the recording medium 23 being contained in the frame 24 as described above is made removable mountable with respect to the system body 21, whereby the alignment of the probe electrodes 22 and the recording medium 23 can be accomplished very accurately and quickly, and such memory cartridge is also high in dust-proof and anti-damage effects. Also, portions of high accuracy are made into a unit as the memory cartridge 20, whereby the productivity of the other portions of the system body 21 is improved, and the interchangeability of the portions of high accuracy makes these portions easy to maintain against the damages by accidents or the like.

The present invention is very effective for a multiprobe system. The multiprobe system as shown in the embodiment has multiple probes parallel-disposed and therefore, is large in the area in XY direction, and when generally viewed, it is great in the amount of variation by a temperature change. However, even if temperature rises to increase the intervals between the adjacent probes, the recording medium side will equally increase and thus, the relative positional relation between each probe and the recording medium will not change. Therefore, in spite of any fluctuation of temperature, all probes can be tracked to the prescribed positions on the medium.

In the foregoing, there has been shown an example in which as a very preferable form, the recording medium and probes are made into an interchangeable cartridge, but alternatively, provision may be made of a system in which the recording medium is made uninterchangeable and all members are fixed as a unit.

The technical idea of the present invention is not restricted to the memory system as described above, but can be applied to various kinds of information recording/reproducing apparatuses. As an example of the recording apparatus, mention may be made of an electronic line depicting apparatus for use chiefly for the formation of semiconductor mask patterns which uses probes to depict a minute pattern on a medium. Also, as an example of the reproducing apparatus, mention may be made of a microscope using probe to read the surface condition of a sample, i.e., a so-called STM.

What is claimed is:

1. A memory cartridge attachable to and detachable from a memory system, said memory cartridge comprising:
   a recording medium;
   a plurality of probes for effecting at least one of writing data and reading data relative to said recording medium;
   a plurality of cantilever beams for supporting each of said probes and moving said probes relative to said recording medium;
   a base having said cantilevers attached in parallel thereto;
   a substrate supporting said recording medium thereon and having a coefficient of linear expansion approximately equal to that of said base;
   a box type case containing said recording medium, said plurality of probes, said plurality of cantilever beams, said base and said substrate; and
   an electrode provided on an outside of said case for being connected to an electrode provided in said memory system to provide electrical connection with said memory system when said memory cartridge is attached to said memory system.

2. A memory cartridge according to claim 1, wherein said cantilevers each have a bimorph beam.

3. A memory cartridge according to claim 1, wherein a material of said base includes Si, and a material of said substrate includes Si or Ge.

4. A memory cartridge according to claim 1, wherein a material of said base includes Si, and a material of said recording medium is high polymer film.

5. A memory cartridge according to claim 4, wherein said high polymer film is polyimide film.

6. A memory cartridge attachable to and detachable from a memory system, said memory cartridge comprising:
   a recording medium;
   a base for attaching a probe for effecting at least one of writing data and reading data relative to said recording medium;
   a substrate supporting said recording medium and capable of moving relative to said base;
   a box type case containing said recording medium, said base and said substrate; and
   an electrode provided on an outside of said case for being connected to an electrode provided in said memory system to provide electrical connection with said memory system when said memory cartridge is attached to said memory system,
   wherein said base and said substrate are approximately equal to each other in coefficient of linear expansion.

7. A memory cartridge according to claim 6, containing a plurality of said probes, wherein the plurality of said probes are attached in parallel to said base.

8. A memory cartridge according to claim 6, wherein said probe is attached to said base through a cantilever.

9. A memory cartridge according to claim 8, wherein said cantilever has a bimorph beam.

10. An information processing system for effecting at least one of recording information and reproducing information, said system comprising:
    a memory cartridge comprising:
       a recording medium;
       a base to which a probe for effecting at least one of writing data and reading data relative to said recording medium is attached;
       a substrate supporting said recording medium and capable of moving relative to said base;
       a box type case containing said recording medium, said base and said substrate, wherein said base and said substrate are approximately equal to each other in coefficient of linear expansion; and
       an electrode provided on an outside of said case; and
    a memory system comprising:
       an electrode connection portion for being connected to said electrode of said memory cartridge to provide electrical connection with said memory system when said memory cartridge is attached to said memory system; and
       voltage application means for applying voltage between said probe and said recording medium in order to record information or reproduce information.

* * * * *